United States Patent
Seto et al.

(10) Patent No.: US 7,019,660 B2
(45) Date of Patent: Mar. 28, 2006

(54) VEHICLE PASSENGER DETECTION DEVICE

(75) Inventors: Takayuki Seto, Hiroshima (JP); Yousuke Nishimoto, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 139 days.

(21) Appl. No.: 10/684,336

(22) Filed: Oct. 10, 2003

(65) Prior Publication Data

US 2004/0135406 A1    Jul. 15, 2004

(30) Foreign Application Priority Data

Oct. 16, 2002   (JP) .............. 2002-301566

(51) Int. Cl.
  *G08B 21/00*   (2006.01)
(52) U.S. Cl. .............. 340/666; 340/665; 340/667; 340/436; 340/438; 701/45; 701/49
(58) Field of Classification Search ............ 340/666, 340/438, 426, 436, 561, 567, 667, 665; 180/271, 180/273, 274, 282; 307/10.1, 121; 701/45, 701/49; 297/216.1, 216.13, 216.15, 216.16
See application file for complete search history.

(56) References Cited

U.S. PATENT DOCUMENTS 6,246,936 B1   6/2001 Murphy et al.
6,598,900 B1 *  7/2003 Stanley et al. .............. 280/735
6,696,948 B1 *  2/2004 Thompson et al. .......... 340/561
2002/0024257 A1  2/2002 Fujimoto et al.

FOREIGN PATENT DOCUMENTS

JP   2000-258233   9/2000

OTHER PUBLICATIONS

European Search Report dated Jan. 9, 2004.

* cited by examiner

*Primary Examiner*—Hung Nguyen
(74) *Attorney, Agent, or Firm*—Nixon Peabody LLP; Donald R. Studebaker (57) ABSTRACT

The present invention has as its object to provide a vehicle passenger detection device that is able to prevent erroneous determinations arising from mechanical hysteresis. The present invention provides a vehicle passenger detection device comprising: weight measurement means, provided with a weight sensor disposed between a seat and floor of a vehicle, that measures the load applied to the seat; fluctuation amplitude detection means that detects the amplitude of fluctuation in values measured by the weight measurement means; correction means that applies a negative correction to the value measured by the weight measurement means when the fluctuation amplitude is smaller than a stipulated value; and passenger presence determination means that determines the presence of a passenger upon the seat by comparing the value measured by the weight measurement means against a stipulated threshold value.

6 Claims, 7 Drawing Sheets

VEHICLE PASSENGER DETECTION DEVICE

BACKGROUND OF THE INVENTION

1. Field of the Invention

The present invention relates to a vehicle passenger detection device and particularly to a vehicle passenger detection device that detects the presence of a passenger upon a seat.

2. Background

Known examples of such a vehicle passenger detection device include, for example, the device taught by Japanese Unexamined Patent Publication No. 2000-258233. With such a vehicle passenger detection device, a strain gage-type weight measurement device 3 is provided between a seat frame 1 (or the lower rail of the seat slide rails) provided in the lower part of the seat and a seat bracket 2 attached to the floor panel.

Figure 1:
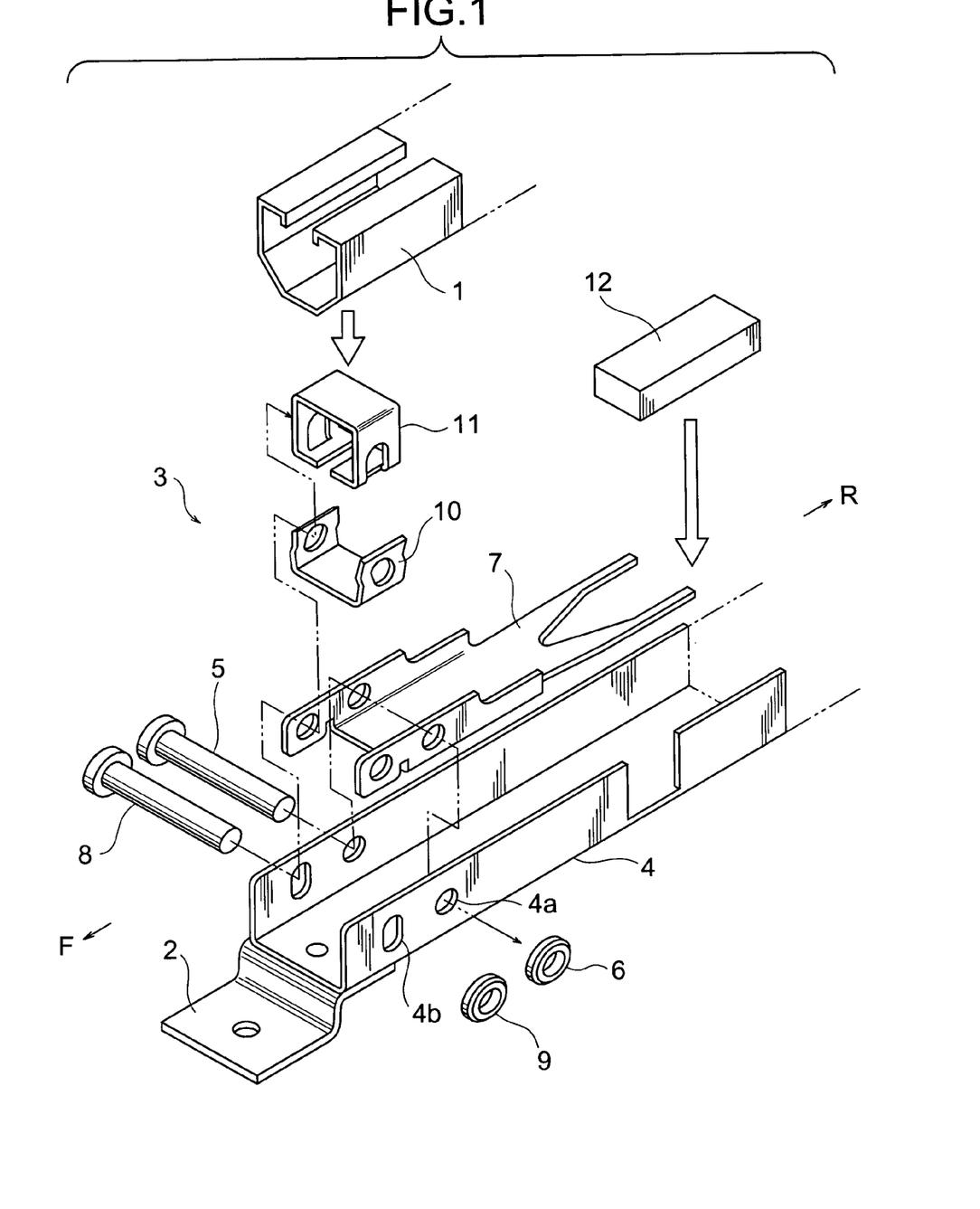
FIG. 1 is a perspective exploded view showing a vehicle passenger detection device according to the background art and a preferred embodiment of the present invention.

This weight measurement device 3 consists of a base member 4 provided with a pin hole 4a and slot 4b, an arm 7 pivotally supported upon the base member 4 using a base pin 5 serving as the fulcrum (support axle) and a retainer 6, a flat spring 10 that is attached to one end of the arm 7 with a bracket pin 8 and retainer 9, a pin bracket 11 as a load transfer member and a strain gage-type load sensor 12. In FIG. 1, F indicates the front of the vehicle while R indicates the rear of the vehicle.

With this device, when the load of the passenger upon the seat is transferred via the pin bracket 11, flat spring 10 and bracket pin 8 to the end of the arm 7, this arm 7 is pivotally supported by the base pin 5, so it rocks about the base pin 5, the motion of the other end of the arm 7 is transferred to the load sensor 12 and the load of the passenger is detected by the load sensor 12. With this device, in order to prevent excessive rocking of the arm 7, bushings are disposed between the arm 7 and base member 4, and moreover, the base pin 5 on the fulcrum side is pivotally supported in the pin hole 4a so that backlash does not occur.

However, with a weight measurement device such as that shown in FIG. 1, mechanical hysteresis occurs.

Mechanical hysteresis refers to a situation wherein, when the passenger exits the vehicle, the load on the seat is released and the seat returns to its original position, and at the stage when the load on the weight measurement device reaches a very small load of roughly 2 kg, for example, this very small load balances against the mechanical resistance of the moving parts within the weight measurement device, and thus the weight measurement device does not return to the zero position as its original position. As a result, even though the passenger is no longer present upon the seat, a constant load continues to be input to the load measurement device of the vehicle passenger detection device.

The results of detection by the vehicle passenger detection device are used to control airbag deployment, so the vehicle passenger detection device is required in order to determine the presence of a passenger upon the seat and whether the passenger is an adult or child. With a vehicle passenger detection device as described above, a determination is made among the states of no passenger present or an adult or child passenger present based on the load detected by the weight measurement device and predetermined threshold values.

Children are light in weight, so the threshold value for distinguishing between the states of no passenger present and a child passenger present is set to a relatively small value. For this reason, in the state in which mechanical hysteresis causes a constant load to be input to the load measurement device of the vehicle passenger detection device, if cargo is placed upon the seat, then the total load of the load due to the mechanical hysteresis and the load due to cargo may exceed the threshold value for distinguishing the state of no passenger present from the state in which a child passenger is present in the load measurement device of the vehicle passenger detection device. As a result, there is a problem in that the vehicle passenger detection device may erroneously determine that a child is sitting on that seat even though no passenger is present.

SUMMARY OF THE INVENTION

The present invention was accomplished in order to solve this problem and has as its object to provide a vehicle passenger detection device that is able to prevent erroneous determinations arising from mechanical hysteresis.

The present invention was achieved based on the discovery that although mechanical hysteresis occurs when a load is applied to a seat and this load is returned to zero, this mechanical hysteresis is eliminated when the seat is subjected to a certain amount of vibration.

The present invention thus provides a vehicle passenger detection device wherein the vehicle passenger detection device comprises: weight measurement means, provided with a weight sensor disposed between a seat and floor of a vehicle, that measures the load applied to the seat; fluctuation amplitude detection means that detects the amplitude of fluctuation in values measured by the weight measurement means; correction means that applies a negative correction to the value measured by the weight measurement means when the fluctuation amplitude is smaller than a stipulated value; and passenger presence determination means that determines the presence of a passenger upon the seat by comparing the value measured by the weight measurement means against a stipulated threshold value.

With the present invention having such a constitution, when the fluctuation of the value measured by the weight measurement device is determined to be less than a stipulated amplitude, residual hysteresis is assumed to be present, so the conditions for determining the presence of passengers are changed and the determination of the presence of passengers is performed under conditions with the effects of mechanical hysteresis eliminated. Thus, the detection of passengers can be performed accurately even in a range that is easily affected by mechanical hysteresis.

In a preferred embodiment of the present invention, the weight measurement means comprises a plurality of weight sensors, and the fluctuation amplitude detection means detects the amplitude of fluctuation in the values measured by the various weight sensors and further comprises correction control means that controls the negative correction when the amplitude of fluctuation of the values measured by at least one of the weight sensors is greater than said stipulated value.

Another embodiment of the present invention comprises: adult passenger determination means that compares the measured value against an adult passenger determination threshold value greater than the threshold value and thus determines if the passenger is an adult or child, and display means that, when the passenger presence determination means determines that a passenger is present and the adult passenger determination means determines that the passenger is a child, disables airbag deployment and activates an indicator that indicates that airbag deployment is disabled.

Another embodiment of the present invention is a vehicle passenger detection device where the vehicle passenger detection device comprises: weight measurement means, provided with a weight sensor disposed between a seat and floor of a vehicle, that measures the load applied to the seat; fluctuation amplitude detection means that detects the amplitude of fluctuation in values measured by the weight measurement means; and passenger presence determination means that determines the presence of a passenger by comparing the value measured by the weight measurement means against a stipulated threshold value, wherein: if the amplitude of fluctuation is greater than the stipulated value, the passenger presence determination means compares the value measured by the weight measurement means against a first threshold value to determine the presence of a passenger, and if the value measured by the weight measurement means is smaller than a stipulated value, the passenger presence determination means compares the value measured by the weight measurement means against a hysteresis threshold value greater than the first threshold value to determine the presence of a passenger.

DETAILED DESCRIPTION OF THE PREFERRED EMBODIMENTS

Preferred embodiments of the present invention will be explained with reference to the drawings.

Figure 2:
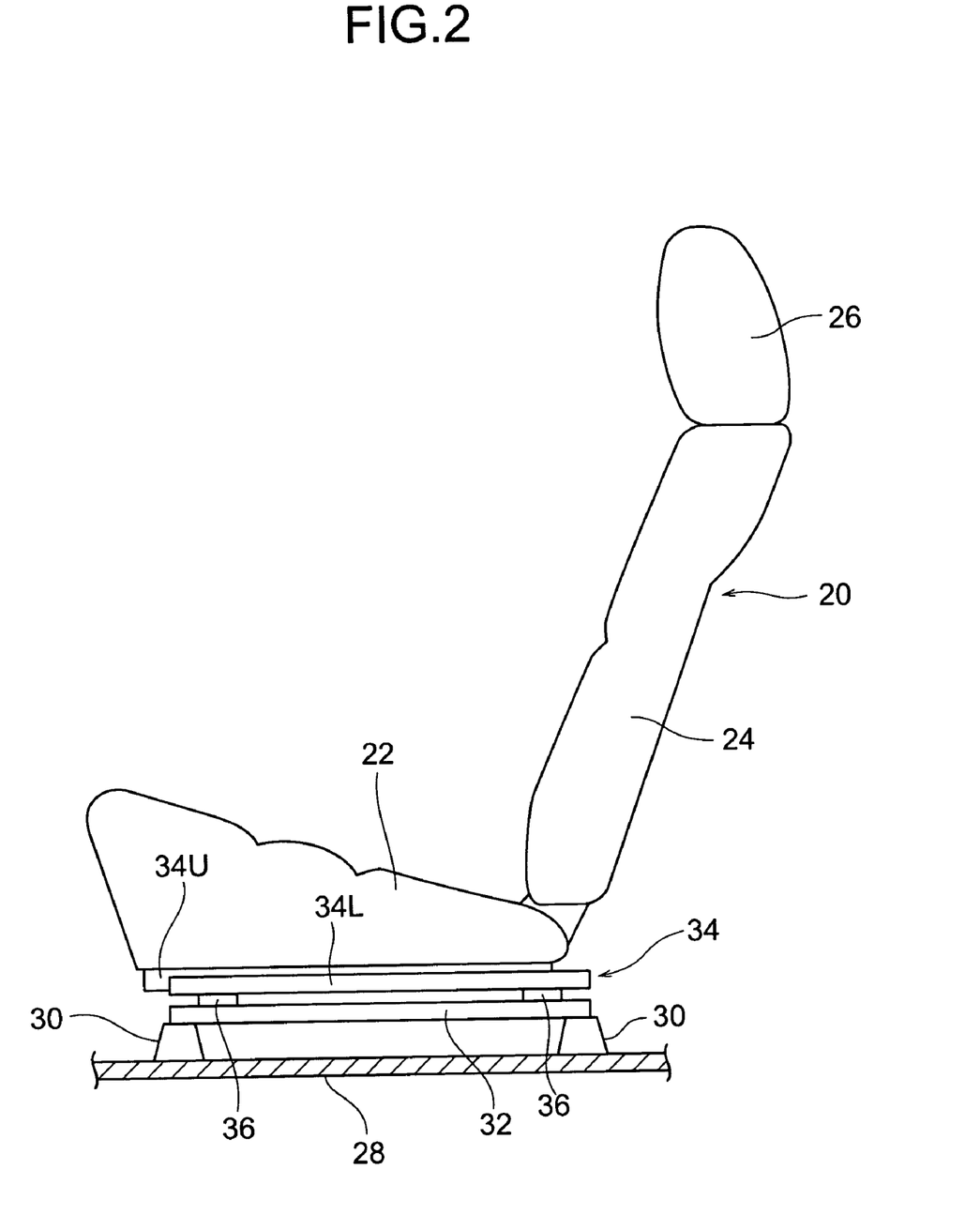
FIG. 2 is a side view of a seat equipped with the vehicle passenger detection device according to a preferred embodiment of the present invention.

FIG. 2 is a schematic side view of a vehicle seat 20 incorporating the weight measurement device and other components of the vehicle passenger detection device according to preferred embodiments of the present invention.

This seat 20 consists of a seat cushion 22, seat back 24 and headrest 26, being a passenger seat. Below the seat 20 is disposed a seat bracket 30 secured to the floor panel 28 of the vehicle. To this seat bracket 30 are attached a left/right pair of base members 32 (only one of which is shown) extending toward the front and rear of the vehicle. Each of the base members 32 has the same construction as the base member 4 of FIG. 1. Each of these base members 32 is attached to seat slide rails 34 extending toward the front and rear of the vehicle.

The seat slide rails 34 consist of an upper rail 34U secured to the bottom of the seat cushion 22 and a lower rail 34L secured to the base members 32. The upper rail 34U and lower rail 34L are assembled such that they are able to move relative to each other. With this construction, the seat 20 is mounted such that it is able to move forward and backward with respect to the floor panel 28 via the seat slide rails 34 consisting of an upper rail 34U and lower rail 34L.

As shown in FIG. 2, a load sensor 36 is disposed between the lower rail 34L and base members 32. This load sensor 36 is the same as load sensor 12 of FIG. 1, and together with other constituent members (not shown) constitutes the same weight measurement device as the weight measurement device 3 of FIG. 1. Accordingly, this embodiment is constituted such that the load applied to the seat 20 can be measured by means of the weight measurement device including the load sensor 36. In addition, to one weight measurement device each is attached to the front and back of each of the base members 32, so a total of four devices are attached to one seat 20.

Figure 3:
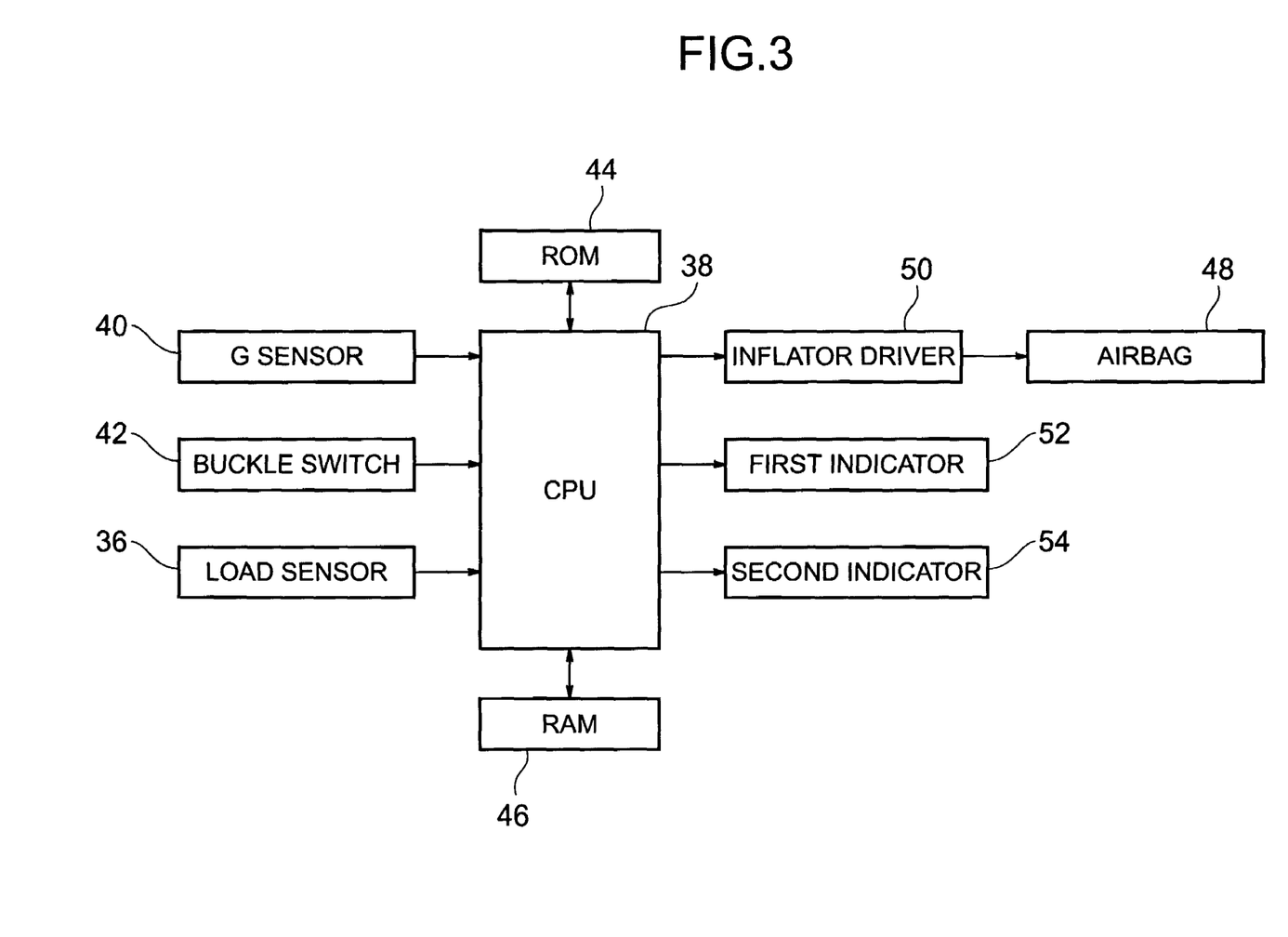
FIG. 3 is a block diagram showing the constitution of the vehicle passenger detection device according to a preferred embodiment of the present invention.

FIG. 3 is a schematic block diagram showing the constitution of the vehicle passenger detection device according to the present embodiment. In the present embodiment, a CPU 38 constituting the vehicle passenger detection device is constituted such that it is able to perform airbag deployment control in addition to the passenger detection process.

The CPU 38 is constituted so as to accept inputs from a G sensor (collision sensor) 40 and a buckle switch 42 that detects whether the seat belt is buckled. In addition, to the CPU 38 is connected ROM 44 for storing a passenger presence determination program and airbag deployment program and RAM 46 for storing the required data. The CPU 38 is further constituted such that it can send output signals to an inflator driver 50 that inflates an airbag 48, a first indicator 52 that indicates the presence of a passenger and a second indicator 54 that indicates that the passenger is a child so the airbag is in the disabled state. In this embodiment, the first and second indicators are constituted such that they are lamps visible to the passenger.

The content of the processes performed by the CPU 38 of the vehicle passenger detection device of the present embodiment will be described with reference to flowcharts. The process given below is executed immediately upon the ignition switch being turned ON.

Figure 4:
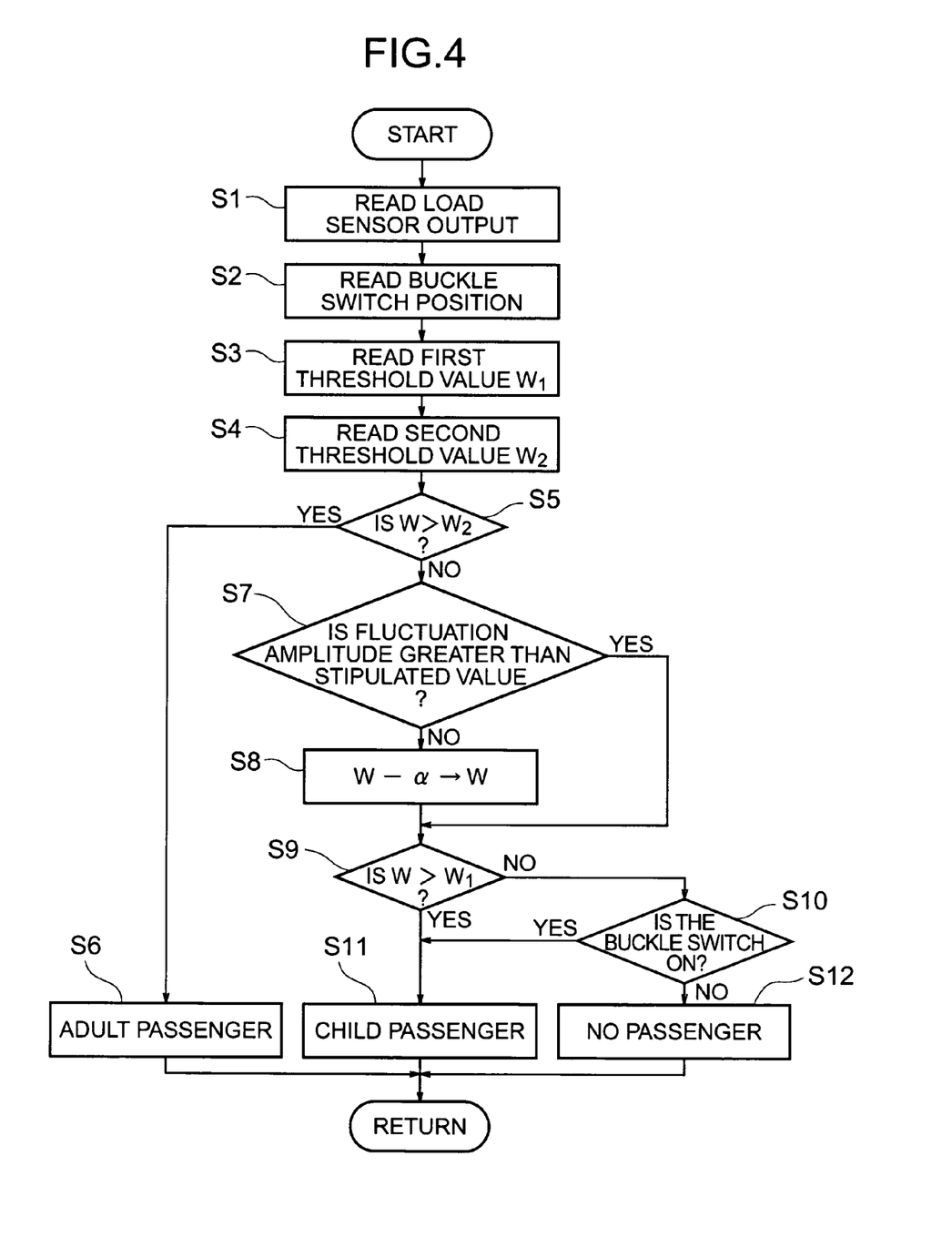
FIG. 4 is a flowchart showing the content of the passenger detection process performed by the CPU of the vehicle passenger detection device according to Preferred Embodiment 1 of the present invention.

FIG. 4 is a flowchart showing the content of the passenger detection process performed by the CPU 38. In Step S1, input the seat load W detected by the load sensors 36 and the amplitude of fluctuation of the output value of each load sensor. In the present embodiment, the seat load W is taken to be the sum of the values of the seat loads from each of the four load sensors 36. In addition, the fluctuation amplitude is taken to be the difference between the maximum value and minimum value of the output of each load sensor during a stipulated period of time, e.g., 750 ms.

Next, in Step S2, input a signal from the buckle switch 42. Next, in Step S3, read from RAM 46 the first threshold value $W_1$ which is a threshold value for distinguishing between the state in which no passenger is present and the state in which the passenger is a child (the child presence determination threshold value) and, in Step S4, read the second threshold value $W_2$ which is a threshold value for distinguishing whether a passenger is an adult or child (the adult presence determination threshold value). In the present embodiment, $W_1$ is set to 7 kg and $W_2$ is set to 35 kg.

Next, advance to Step S5 and determine whether or not the seat load W is greater than the second threshold value $W_2$. If the result of Step S5 is YES, advance to Step S6 where the passenger is determined to be an adult.

If the result of Step S5 is NO, advance to Step S7 and determine whether or not the amplitude of fluctuation in the output value of at least one of the load sensors is greater than a stipulated value (e.g., 2 kg). If the output value of at least one of the load sensors 36 fluctuates by more than the stipulated value, then by this fluctuation it may be assumed that the mechanical hysteresis within the weight measurement device has been eliminated. Accordingly, with the passenger detection device according to the present embodiment, the presence of mechanical hysteresis is assumed based on the amplitude of fluctuation in output values from the load sensor 36.

If the result of Step S7 is NO, or namely the amplitude of fluctuation in the output values from all load sensor 36 is smaller than the stipulated value, residual mechanical hysteresis is assumed to be present, so advance to Step S8 and apply a negative correction that subtracts from the seat load W a correction value a equivalent to the mechanical hysteresis (e.g., 2 kg).

If the result of Step S7 is YES and the processing of Step S8 is complete, advance to Step S9 and determine whether or not the seat load W is greater than the first threshold value $W_1$ used to determine the presence of a child.

If the result of Step S9 is NO, advance to Step S10 and determine whether or not the buckle switch is ON. If the result of Step S10 is YES, the load on the seat is small but the seat belt is buckled, so a child seat is assumed to be installed. Accordingly, the passenger is determined to be a child in Step S11. In addition, if the result of Step S10 is NO, no passenger is determined to be present in Step S12.

In addition, if the result is YES in Step S9, the seat load W is in the range equivalent to the weight of a child, so advance to Step S11 and the passenger is determined to be a child.

Figure 5:
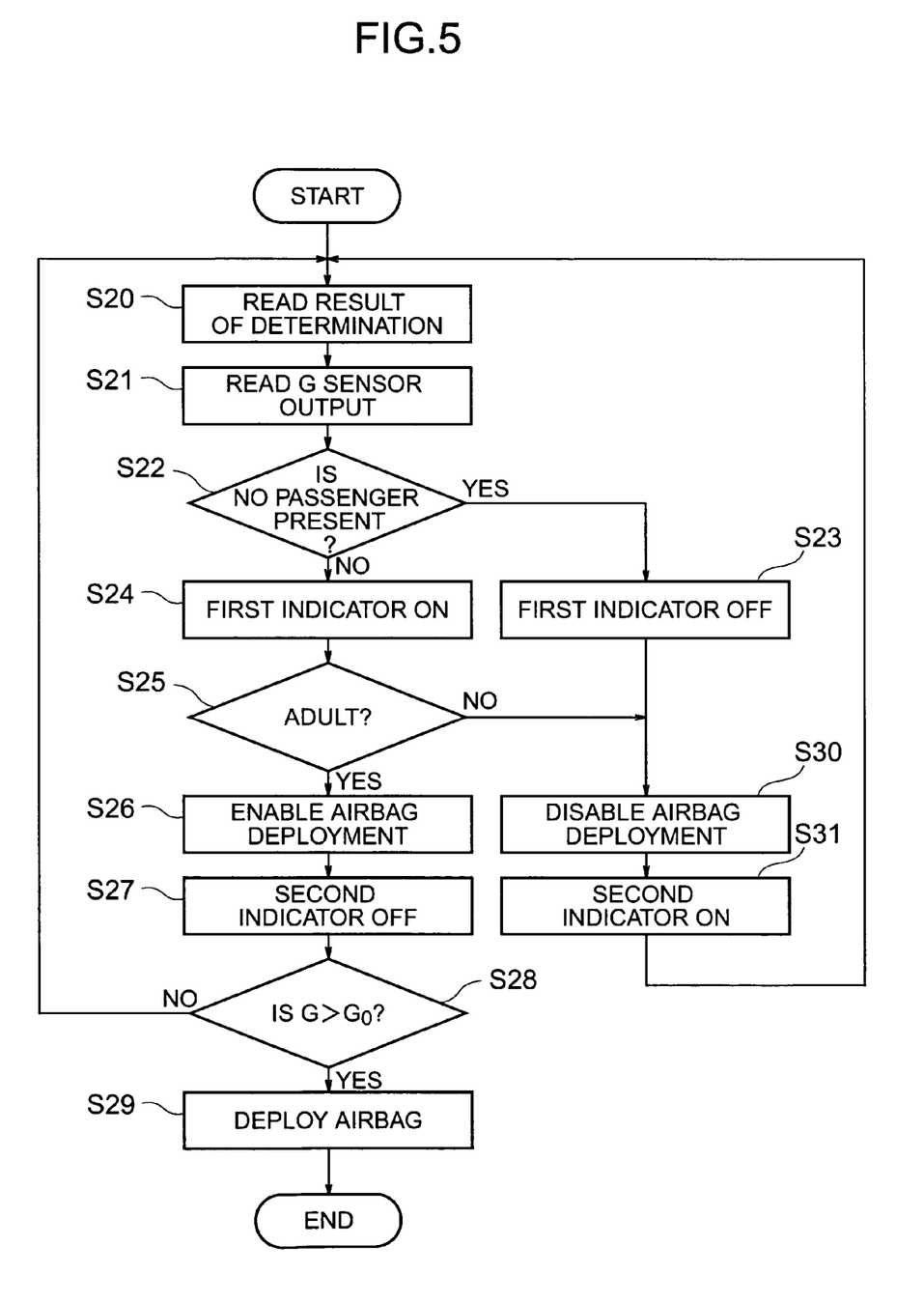
FIG. 5 is a flowchart illustrating the airbag control process performed by the CPU of the vehicle passenger detection device according to Preferred Embodiment 1 of the present invention.

Next, the airbag control process performed by the CPU 38 will be described with reference to the flowchart shown in FIG. 5.

In Step S20, read the results of determination according to the process of FIG. 4 (adult passenger, child passenger, no passenger) and in Step S21 read the signal from the G sensor 40.

Next, in Step S22, determine whether or not no passenger is present upon the seat based on the results read in Step S20. If the result of Step S22 is YES, namely no passenger is present, advance to Step S23 and turn off first indicator 52 which reports the presence of a passenger.

If the result of Step S22 is NO, namely an adult or child passenger is present, advance to Step S24 and turn on the first indicator. Next, advance to Step S25, determine whether or not the passenger upon the seat 20 is an adult, and if YES, namely the passenger is an adult, perform the process of enabling airbag deployment in Step S26, and turn off (OFF) the second indicator 54 in Step S27.

Furthermore, advance to Step S28 and determine whether or not the output value G of the G sensor 40 is greater than the airbag deployment threshold value Go. If the result of Step S28 is YES, then advance to Step S29 and deploy the airbag 48 via inflator driver 50. If the result of Step S28 is NO, then return to Step S20.

On the other hand, if the result of Step S25 is NO and the processing of Step S23 is complete, either no passenger is present or the passenger is a child so advance to Step S30, perform the process of disabling airbag deployment and advance to Step S31. In Step S31, if the passenger is a child, turn on (ON) the second indicator 54 which indicates that airbag deployment is disabled because the passenger is a child and return to Step S20. If no passenger is present, do not turn on the second indicator 54 in Step S31.

With the present embodiment, if the amplitude of fluctuation of the output value of one of the load sensors among the plurality of load sensors is greater than the stipulated value, the negative correction is controlled, so it is possible to control wasteful corrections.

In addition, with this constitution, the state of normal operation of the passenger detection device can be confirmed by means of the first indicator 52.

Figure 6:
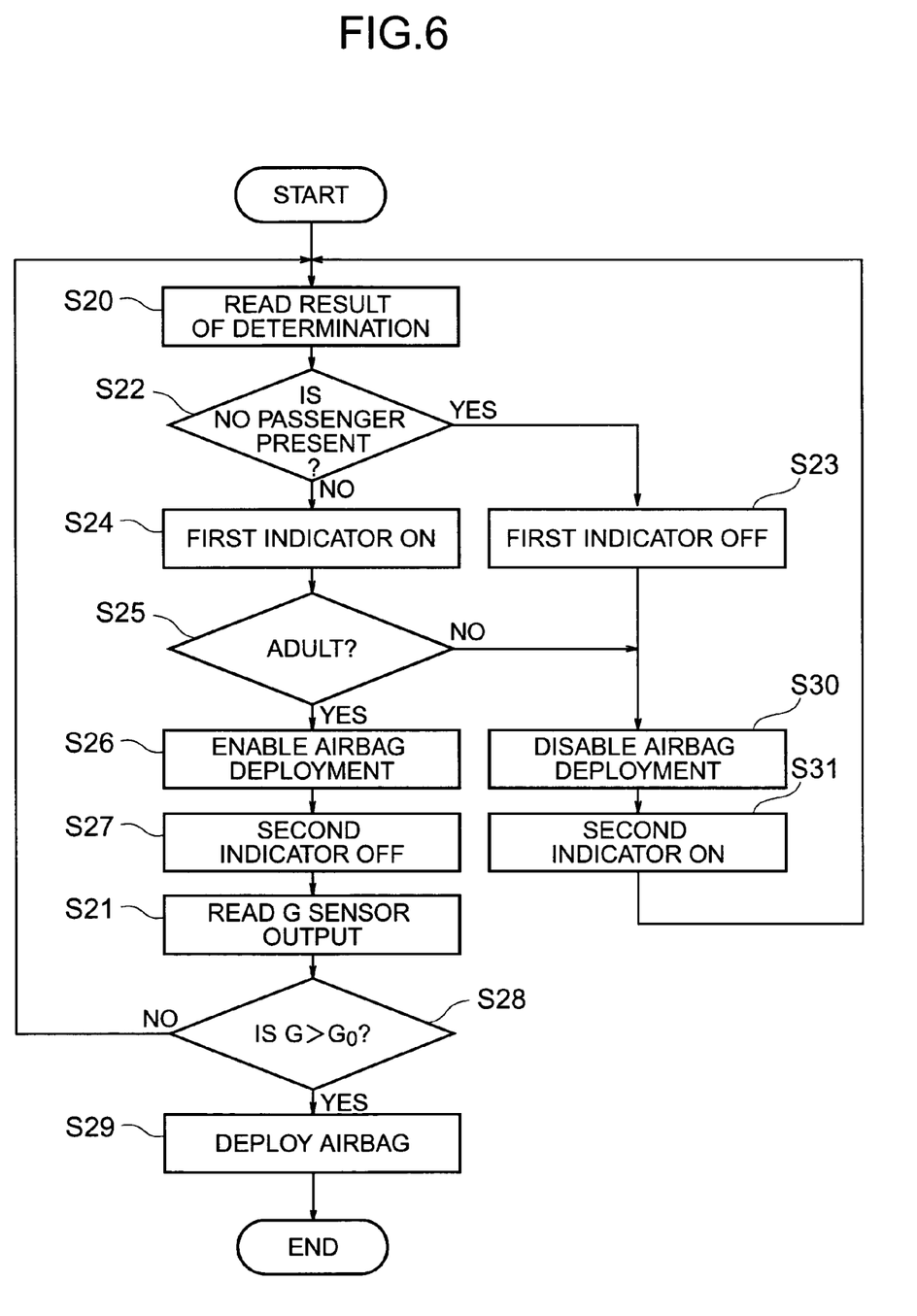
FIG. 6 is a flowchart illustrating a modification of the airbag control process according to Preferred Embodiment 1 of the present invention.

It should be noted that configuration can be adopted wherein the step of reading the signal from the G sensor 40 in Step S21 is performed immediately before the step of comparing the output value G of the G sensor 40 against the airbag deployment threshold value Go in Step S28 as shown in the flowchart of FIG. 6.

A vehicle passenger detection device according to Preferred Embodiment 2 of the present invention will now be described. The basic constitution of this vehicle passenger detection device is the same as that of the vehicle passenger detection device according to Preferred Embodiment 1 above. The differences from Preferred Embodiment 1 lie in the content of the passenger detection process. The passenger detection process of Preferred Embodiment 2 will be described with reference to the flowchart of FIG. 7 which shows the passenger detection process performed by the CPU of Preferred Embodiment 2.

Figure 7:
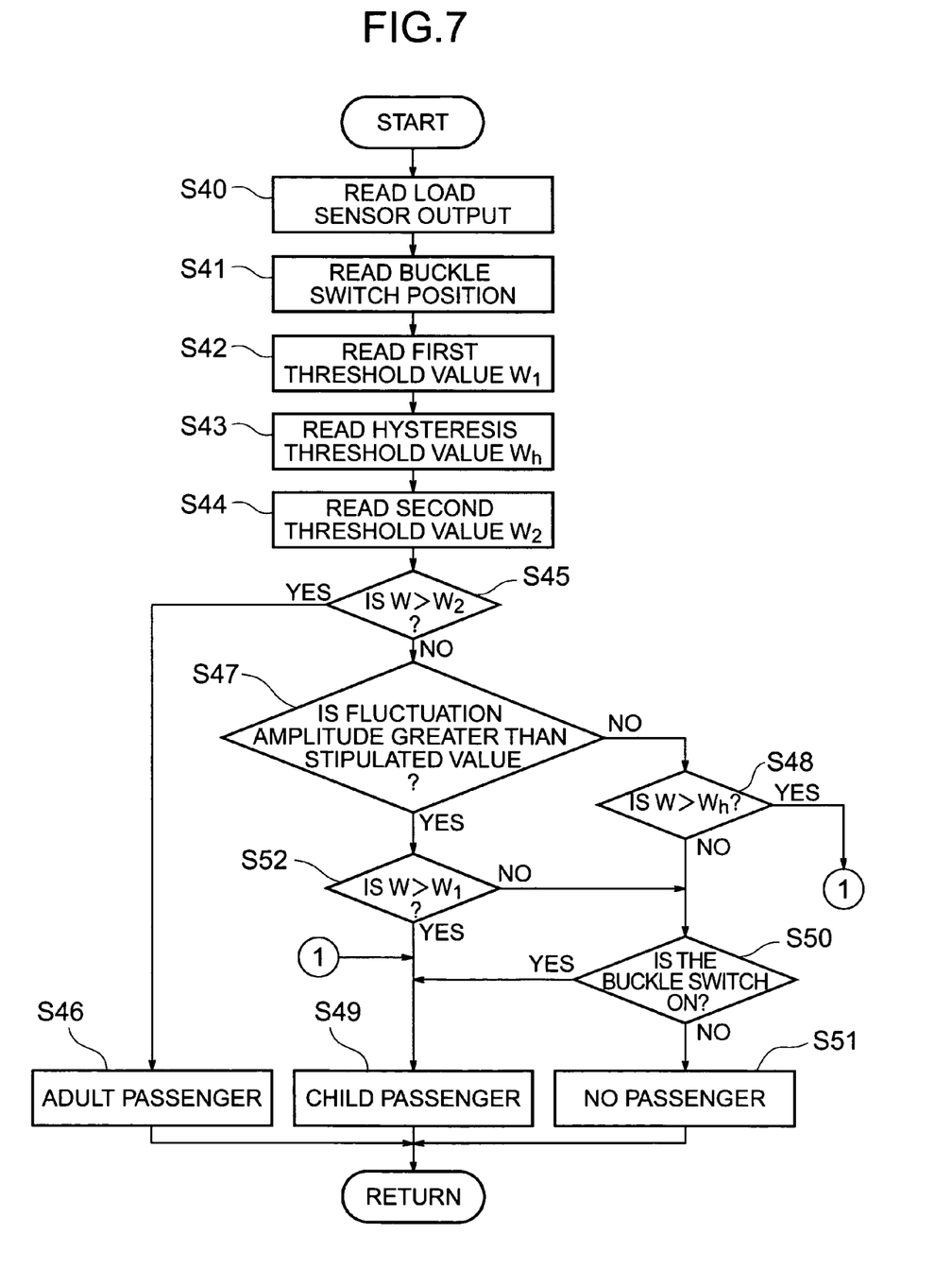
FIG. 7 is a flowchart illustrating the content of the passenger detection process performed by the CPU of the vehicle passenger detection device according to Preferred Embodiment 2 of the present invention.

First, in Step S40, input the seat load W detected by the load sensors 36 and the amplitude of fluctuation of the output value of each load sensor. In the present embodiment also, the seat load W is taken to be the sum of the values of the seat loads from each of the four load sensors 36. In addition, the fluctuation amplitude is taken to be the difference between the maximum value and minimum value of the output of each load sensor during a stipulated period of time, e.g., 750 ms.

Next, in Step S41, input a signal from the buckle switch 42. Next, in Step S42, read from RAM 46 the first threshold value $W_1$ which is a threshold value for distinguishing between the state in which no passenger is present and the state in which the passenger is a child (the child presence determination threshold value), in Step S43 read a hysteresis threshold value $W_h$ greater than the first threshold value and in Step S44 read the second threshold value $W_2$ which is a threshold value for distinguishing whether a passenger is an adult or child (the adult presence determination threshold value), respectively. In the present embodiment, $W_1$ is set to 7 kg, $W_h$ is set to 9 kg and $W_2$ is set to 35 kg.

Next, advance to Step S45 and determine whether or not the seat load W is greater than the second threshold value $W_2$. If the result of Step S45 is YES, advance to Step S46 where the passenger is determined to be an adult.

If the result of Step S45 is NO, advance to Step S47 and determine whether or not the amplitude of fluctuation in the output value of at least one of the load sensors is greater than a stipulated value (e.g., 2 kg). If the output value of at least one of the load sensors 36 fluctuates by more than the stipulated value, then by this fluctuation it may be assumed that the mechanical hysteresis within the weight measurement device has been eliminated. Accordingly, with the passenger detection device according to the present embodiment, the presence of mechanical hysteresis is assumed based on the amplitude of fluctuation in output values from the load sensor 36.

If the result of Step S47 is NO, or namely the amplitude of fluctuation in the output values from all load sensor 36 is smaller than the stipulated value (e.g., 2 kg), residual mechanical hysteresis is assumed to be present, so advance to Step S48 and determine whether or not the seat load W is greater than the hysteresis threshold value $W_h$ which is greater than the first threshold value $W_1$ used to determine the presence of a child. If the result of Step S38 is YES, advance to Step S49 where the passenger is determined to be a child.

If the result of Step S48 is NO, advance to Step S50 and determine whether or not the buckle switch is ON. If the result of Step S50 is YES, the load on the seat is small but the seat belt is buckled, so the state in which a child seat is assumed to be installed. Accordingly, advance to Step S49 where the passenger is determined to be a child.

If the result of Step S48 is NO, advance to Step S50 and determine whether or not the buckle switch is ON. If the result of Step S50 is YES, the load on the seat is small but the seat belt is buckled, so a child seat is assumed to be installed. Accordingly, advance to Step S49 and determine the passenger to be a child. In addition, if the result of Step S50 is NO, advance to Step S51 and determine no passenger to be present.

On the other hand, if the result in Step S47 is YES, advance to Step S52 and determine whether or not the seat load W is greater than the first threshold value $W_1$. If the result in Step S52 is YES, advance to Step S49 and determine the passenger to be a child. In addition, if the result in Step S52 is NO, advance to Step S50 and determine whether a child is present or no passenger is present based on the buckle switch.

With this constitution, a hysteresis threshold value $W_h$ greater than the first threshold value $W_1$ used to determine the presence of a child is set, so if hysteresis is assumed to be remaining, the seat load W is compared against the hysteresis threshold value $W_h$ to make a determination with the effects of mechanical hysteresis eliminated.

The invention is not limited to only the constitution of the preferred embodiments described above.

The first and second indicators in these preferred embodiments are constituted so as to notify the passenger of the indicated content by a lamp being turned on or off, but it is also possible to notify the passenger of the indicated content by turning on lamps of different colors.

The invention claimed is:

1. A vehicle passenger detection device wherein the vehicle passenger detection device comprises:
    weight measurement means, provided with a weight sensor disposed between a seat and floor of a vehicle, that measures the load applied to said seat;
    fluctuation amplitude detection means that detects the amplitude of fluctuation in values measured by said weight measurement means;
    correction means that applies a negative correction to the value measured by said weight measurement means when said fluctuation amplitude is smaller than a stipulated value; and
    passenger presence determination means that determines the presence of a passenger upon said seat by comparing the value measured by said weight measurement means against a stipulated threshold value.

2. A vehicle passenger detection device according to claim 1,
    wherein the weight measurement means comprises a plurality of weight sensors, and
    the fluctuation amplitude detection means detects the amplitude of fluctuation in the values measured by the various weight sensors and further comprises correction control means that controls the negative correction when the amplitude of fluctuation of the values measured by at least one of the weight sensors is greater than said stipulated value.

3. A vehicle passenger detection device according to claim 1, further comprising:
    adult passenger determination means that compares said measured value against an adult passenger determination threshold value greater tan said threshold value and thus determines if the passenger is an adult or child, and
    display means that, when said passenger presence determination means determines that a passenger is present and said adult passenger determination means determines that the passenger is a child, disables airbag deployment and activates an indicator that indicates that airbag deployment is disabled.

4. A vehicle passenger detection device where the vehicle passenger detection device comprises:
    weight measurement means, provided with a weight sensor disposed between a seat and floor of a vehicle, that measures the load applied to said seat;
    fluctuation amplitude detection means that detects the amplitude of fluctuation in values measured by said weight measurement means; and
    passenger presence determination means that determines the presence of a passenger by comparing the value measured by said weight measurement means against a stipulated threshold value,
    wherein if said amplitude of fluctuation is equal to or greater than the stipulated value, said passenger presence determination means compares the value measured by the weight measurement means against a first threshold value to determine the presence of a passenger, and if the value measured by said weight measurement means is smaller than a stipulated value, the passenger presence determination means compares the value measured by said weight measurement means against a hysteresis threshold value greater than the first threshold value to determine the presence of a passenger.

5. A vehicle passenger detection device according to claim 4,
    wherein the weight measurement means comprises a plurality of weight sensors, and
    the fluctuation amplitude detection means detects the amplitude of fluctuation in the values measured by the various weight sensors, and
    when the amplitude of fluctuation of the values measured by at least one of the weight sensors is greater than said stipulated value, said passenger presence determination means compares the values measured by said weight measurement means against said first threshold value and determines the presence of a passenger.

6. A vehicle passenger detection device according to claim 4, further comprising:
    adult passenger determination means that compares said measured value against an adult passenger determination threshold value greater than said threshold value and thus determines if the passenger is an adult or child, and
    display means that, when said passenger presence determination means determines that a passenger is present and said adult passenger determination means determines that the passenger is a child, disables airbag deployment and activates an indicator that indicates that airbag deployment is disabled.

* * * * *